US012579239B2

(12) United States Patent
Smets et al.

(10) Patent No.: US 12,579,239 B2
(45) Date of Patent: Mar. 17, 2026

(54) AUTHENTICATION FOR BIOMETRIC CHECKOUT USING RBA MODELING

(71) Applicant: MASTERCARD INTERNATIONAL INCORPORATED, Purchase, NY (US)

(72) Inventors: Patrik Smets, Begijnendijk (BG); Qing Cao, Purchase, NY (US); Craig Alan Gilbert, Chesterfield, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 212 days.

(21) Appl. No.: 18/059,424

(22) Filed: Nov. 28, 2022

(65) Prior Publication Data

US 2024/0176857 A1     May 30, 2024

(51) Int. Cl.
| | |
|---|---|
| *G06F 21/32* | (2013.01) |
| *G06Q 20/20* | (2012.01) |
| *G06Q 20/32* | (2012.01) |
| *G06Q 20/40* | (2012.01) |
| *G06Q 30/0601* | (2023.01) |

(52) U.S. Cl.
CPC ........... *G06F 21/32* (2013.01); *G06Q 20/206* (2013.01); *G06Q 20/3224* (2013.01); *G06Q 20/40145* (2013.01); *G06Q 30/0643* (2013.01)

(58) Field of Classification Search
CPC ............. G06Q 20/3224; G06Q 20/208; G06Q 20/227
See application file for complete search history.

(56) References Cited

U.S. PATENT DOCUMENTS

| | | |
|---|---|---|
| 8,885,894 B2 | 11/2014 | Rowen et al. |
| 9,390,445 B2 | 7/2016 | Sheets et al. |

(Continued)

FOREIGN PATENT DOCUMENTS

| | | |
|---|---|---|
| CN | 110633985 A | 12/2019 |
| CN | 110633986 A | 12/2019 |

(Continued)

OTHER PUBLICATIONS

Unknown, "Strong eCommerce fraud prevention with 3D Secure 2", What is 3D Secure 2.0 About EMVCo's 3-D Secure, GPayments. com, (Copyright date on webpage2022), 7 pages, https://www. gpayments.com/about/3d-secure-2.

(Continued)

*Primary Examiner* — Barbara B Anyan
(74) *Attorney, Agent, or Firm* — Barta Jones, PLLC

(57) ABSTRACT

A system and method authenticate payment transactions using risk based analysis modeling when multiple payment accounts are identified by input biometric data. An authentication request includes the biometric data associated with a user. Multiple user payment accounts associated with the biometric data are identified. A confidence score is generated for each of the multiple user payment accounts based on context data associated with the payment transaction. The payment account with the highest confidence score is selected. The selected payment account is authenticated for use in processing the payment transaction to ensure payment transactions are performed on the correct payment account.

20 Claims, 6 Drawing Sheets

(56)  References Cited

U.S. PATENT DOCUMENTS

| | | | |
|---|---|---|---|
| 9,881,303 | B2 * | 1/2018 | Vohra .................. G06Q 20/3224 |
| 10,453,050 | B1 | 10/2019 | Arumugam |
| 10,504,116 | B2 | 12/2019 | Collinge et al. |
| 11,176,547 | B2 | 11/2021 | Smets et al. |
| 11,455,641 | B1 * | 9/2022 | Shahidzadeh ......... H04L 67/306 |
| 2012/0284081 | A1 * | 11/2012 | Cheng .................... G06Q 30/02 |
| | | | 705/7.29 |
| 2012/0303412 | A1 * | 11/2012 | Etzioni ................. G06Q 30/06 |
| | | | 705/7.31 |
| 2013/0091052 | A1 * | 4/2013 | Kaperdal ............ G06Q 20/227 |
| | | | 705/39 |
| 2013/0285855 | A1 * | 10/2013 | Dupray ................ H04W 4/021 |
| | | | 342/451 |
| 2015/0195352 | A1 * | 7/2015 | Ooi ........................ H04L 67/10 |
| | | | 709/203 |
| 2015/0227938 | A1 | 8/2015 | Smets et al. |
| 2016/0012465 | A1 | 1/2016 | Sharp |
| 2017/0004487 | A1 * | 1/2017 | Hagen ............... G06Q 20/4016 |
| 2019/0340620 | A1 | 11/2019 | Sheets et al. |
| 2019/0377819 | A1 * | 12/2019 | Filliben ................. G06N 3/084 |
| 2019/0378050 | A1 * | 12/2019 | Edkin .................... G06N 20/20 |
| 2021/0327234 | A1 * | 10/2021 | Chandramowle .... G06Q 20/208 |
| 2023/0206293 | A1 * | 6/2023 | Brawer ............. G06Q 30/0603 |
| | | | 705/343 |
| 2023/0206312 | A1 * | 6/2023 | Brawer ............. G06Q 30/0643 |
| | | | 705/27.1 |

FOREIGN PATENT DOCUMENTS

| | | |
|---|---|---|
| CN | 110633987 A | 12/2019 |
| CN | 110633988 A | 12/2019 |
| CN | 114041157 A | 2/2022 |
| KR | 20190135884 A | 12/2019 |
| KR | 20190135885 A | 12/2019 |
| KR | 102228254 B1 | 3/2021 |
| WO | 2020125839 A1 | 6/2020 |

OTHER PUBLICATIONS

Unknown, "AllSecure Payments Gateway and 3-D Secure 2.0", AllSecure, Allsecure.com (Copyright date on webpage2021), 5 pages.

Unknown, "Risk-Based Authentication and 3D Secure 2 Frictionless Flow Explained", GPayments.com, (Copyright date on webpage2022), 11 pages.

Lee, Kang Ha, "International Search Report & Written Opinion", International Patent Application No. PCT/US2023/033021, mailed Jan. 5, 2024, 10 pages.

\* cited by examiner

300

310 — RECEIVE A REQUEST FOR IDENTIFICATION OF A PAYMENT CARD TRANSACTION, INCLUDING A CONSUMER PROVIDING BIOMETRIC DATA AT A POINT OF SALE TERMINAL

320 — ACCEPT THE USER'S BIOMETRIC DATA

330 — DETERMINE A CONFIDENCE SCORE BASED ON CONTEXT INFORMATION

340 — GENERATE A TOKEN BASED ON THE CONFIDENCE SCORE TO AUTHORIZE PAYMENT TO A MERCHANT

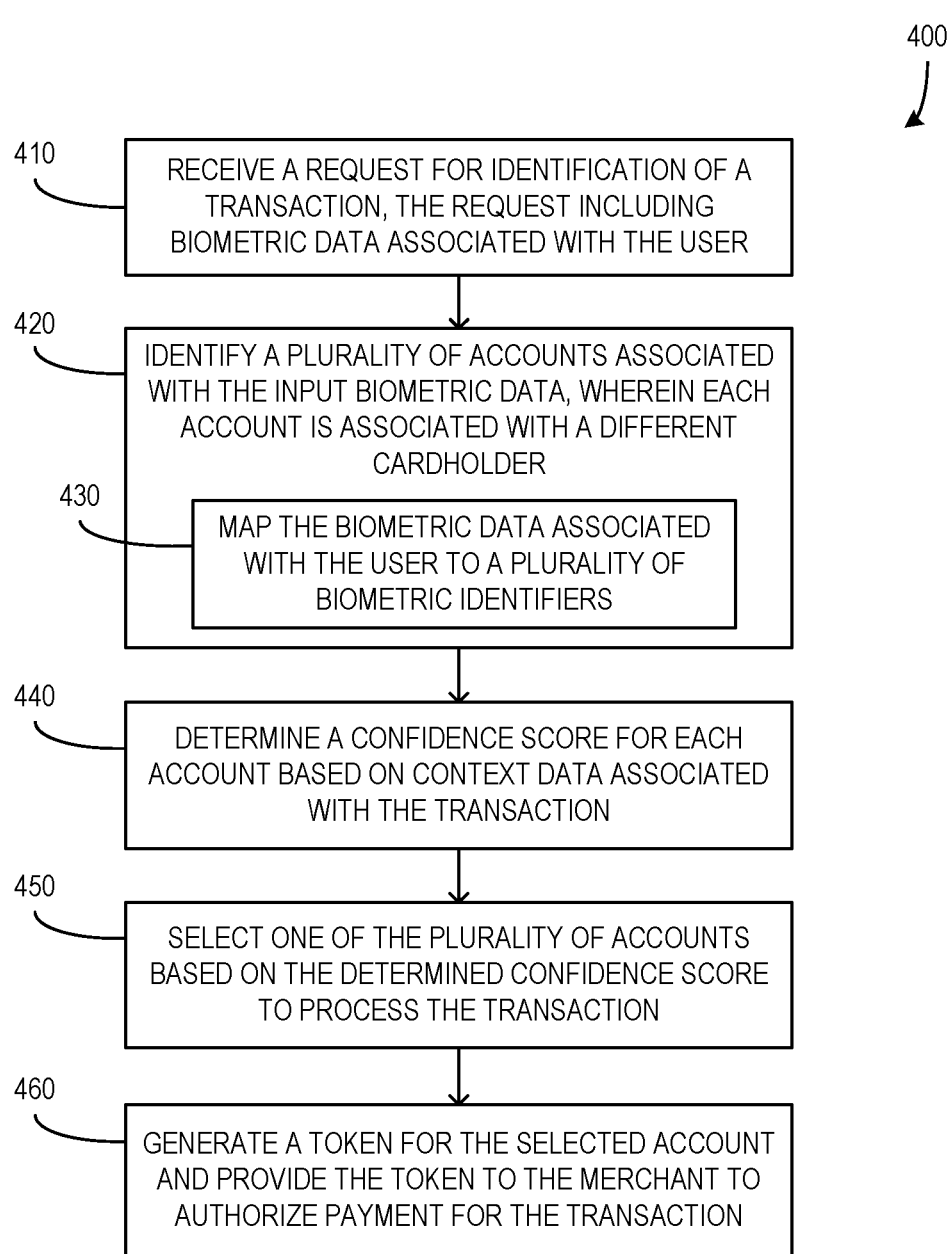

400

410 — RECEIVE A REQUEST FOR IDENTIFICATION OF A TRANSACTION, THE REQUEST INCLUDING BIOMETRIC DATA ASSOCIATED WITH THE USER

420 — IDENTIFY A PLURALITY OF ACCOUNTS ASSOCIATED WITH THE INPUT BIOMETRIC DATA, WHEREIN EACH ACCOUNT IS ASSOCIATED WITH A DIFFERENT CARDHOLDER

430 — MAP THE BIOMETRIC DATA ASSOCIATED WITH THE USER TO A PLURALITY OF BIOMETRIC IDENTIFIERS

440 — DETERMINE A CONFIDENCE SCORE FOR EACH ACCOUNT BASED ON CONTEXT DATA ASSOCIATED WITH THE TRANSACTION

450 — SELECT ONE OF THE PLURALITY OF ACCOUNTS BASED ON THE DETERMINED CONFIDENCE SCORE TO PROCESS THE TRANSACTION

460 — GENERATE A TOKEN FOR THE SELECTED ACCOUNT AND PROVIDE THE TOKEN TO THE MERCHANT TO AUTHORIZE PAYMENT FOR THE TRANSACTION

FIG. 4

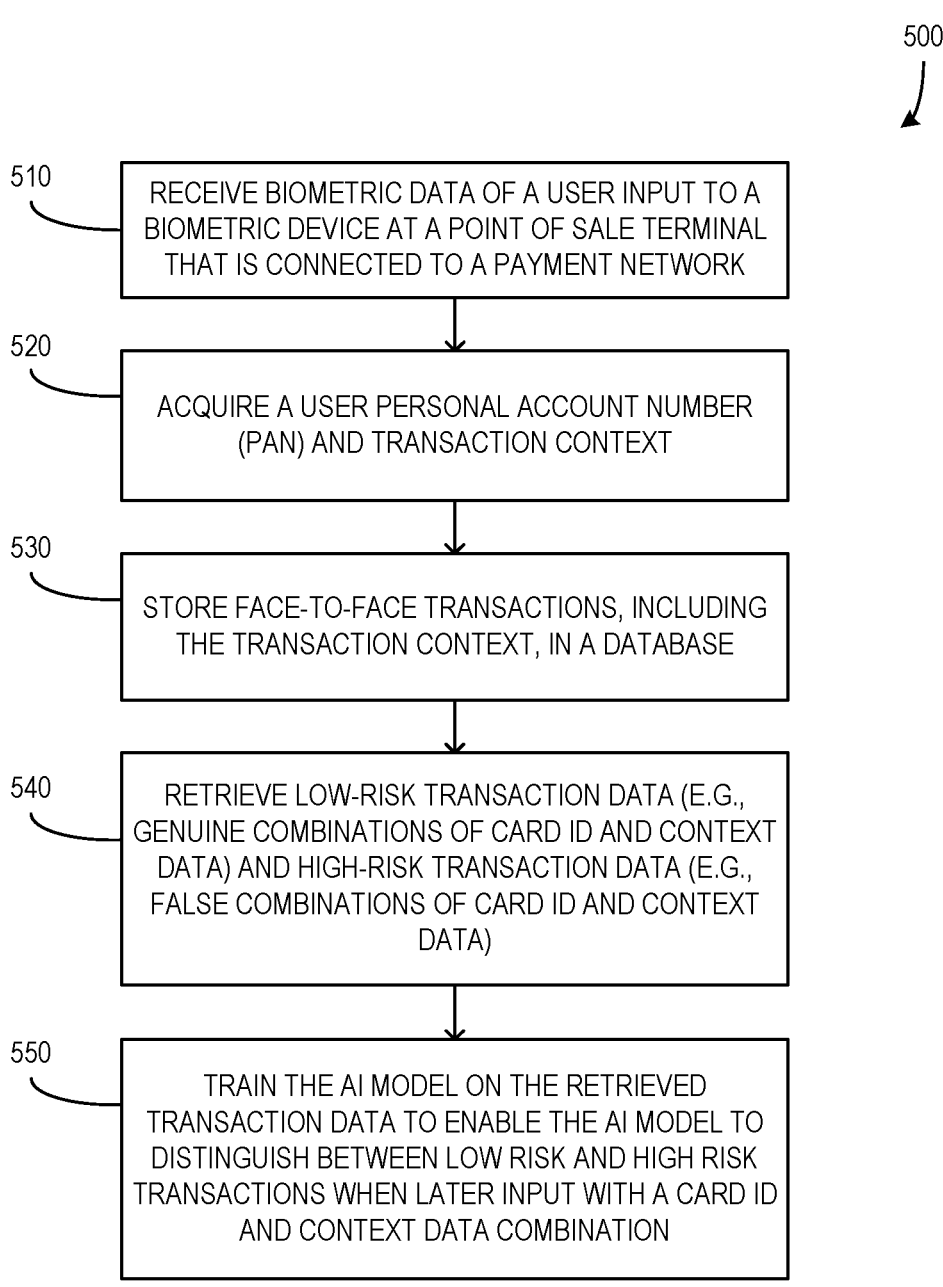

510  RECEIVE BIOMETRIC DATA OF A USER INPUT TO A BIOMETRIC DEVICE AT A POINT OF SALE TERMINAL THAT IS CONNECTED TO A PAYMENT NETWORK

520  ACQUIRE A USER PERSONAL ACCOUNT NUMBER (PAN) AND TRANSACTION CONTEXT

530  STORE FACE-TO-FACE TRANSACTIONS, INCLUDING THE TRANSACTION CONTEXT, IN A DATABASE

540  RETRIEVE LOW-RISK TRANSACTION DATA (E.G., GENUINE COMBINATIONS OF CARD ID AND CONTEXT DATA) AND HIGH-RISK TRANSACTION DATA (E.G., FALSE COMBINATIONS OF CARD ID AND CONTEXT DATA)

550  TRAIN THE AI MODEL ON THE RETRIEVED TRANSACTION DATA TO ENABLE THE AI MODEL TO DISTINGUISH BETWEEN LOW RISK AND HIGH RISK TRANSACTIONS WHEN LATER INPUT WITH A CARD ID AND CONTEXT DATA COMBINATION

AUTHENTICATION FOR BIOMETRIC CHECKOUT USING RBA MODELING

BACKGROUND

Authenticating a user and/or a payment device during payment transactions using multi-step authentications can be a slow and cumbersome process for many users due to the necessity of presenting physical payment cards, mobile computing devices associated with digital wallets or other physical payment devices at the point-of-sale (POS) terminal. To simplify and further secure payment transactions, user biometric data can be utilized for contactless payment and/or completion of a payment transaction where the physical payment device is not present at the POS terminal. The use of biometric data not only ensures a more secure transaction, but also permits the user to transaction without a physical payment device, such as a card or a mobile.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Examples provide a system and method for a secure payment transaction system using risk-based authentication (RBA). One or more payment accounts are identified which correspond to biometric data received in response to an identification request for completion of a secure payment transaction. A plurality of confidence scores is generated using the payment account(s) and context data associated with the transaction. The confidence scores include a confidence score for each account of the identified payment accounts. The payment account having the highest confidence score is selected. A token is generated for use in authorizing payment using the selected account for completion of the payment transaction.

BRIEF DESCRIPTION OF DRAWINGS

The present description will be better understood from the following detailed description read in light of the accompanying drawings, herein:

FIG. 4 is a flowchart illustrating operation of a computing device to authenticate a payment transaction using biometric data.

FIG. 5 is a flowchart illustrating operation of a computing device to train an artificial intelligence model for calculating a confidence score using biometric data during a secure payment transaction.

Corresponding reference characters indicate corresponding parts throughout the drawings. In FIGS. 1 to 6, the systems are illustrated as schematic drawings. The drawings may not be to scale.

DETAILED DESCRIPTION

Figure 1:
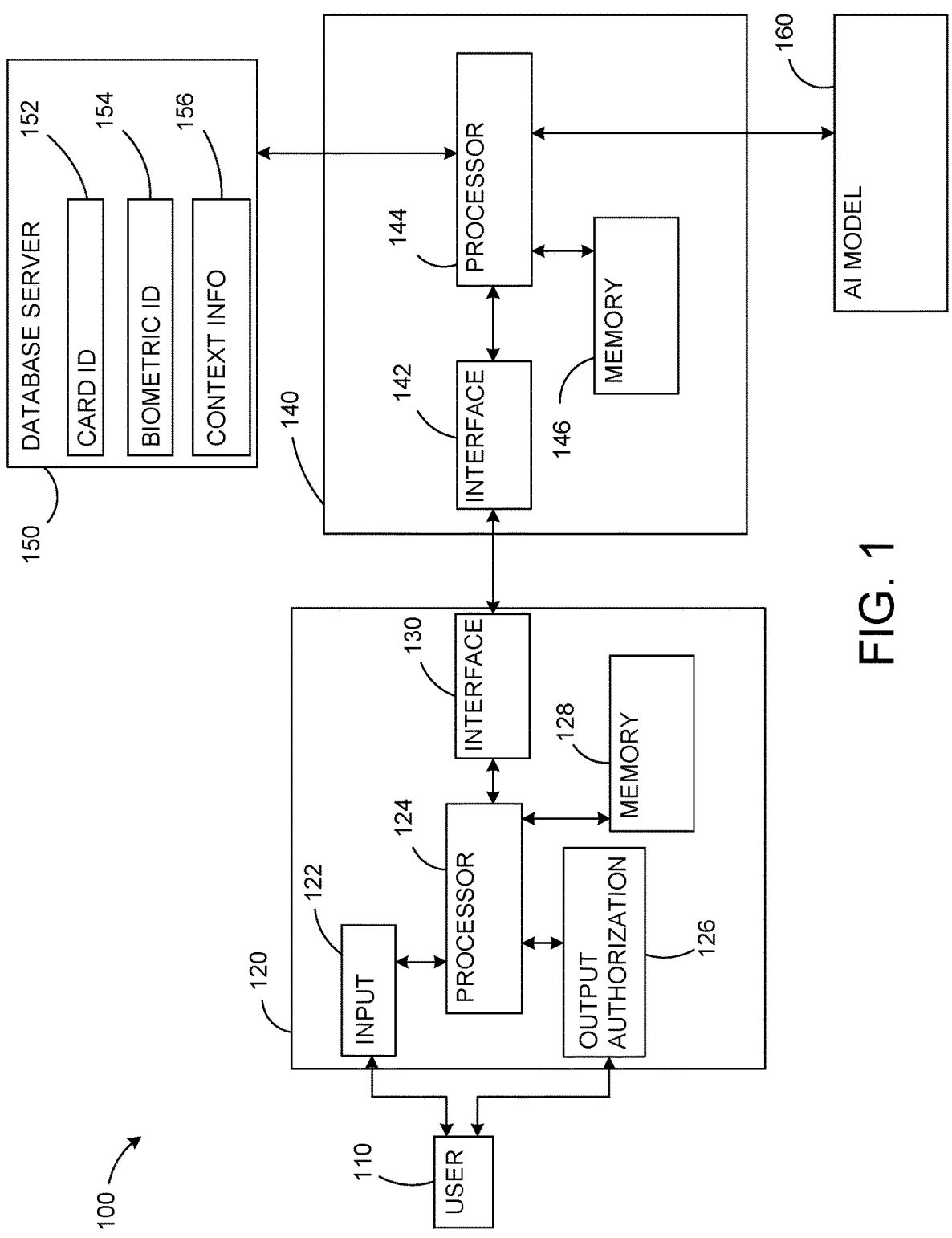
FIG. 1 is a block diagram illustrating a system using risk-based authentication (RBA) with biometric data to improve payment transaction security.

A more detailed understanding can be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that can in isolation and out of context be read as absolute and therefore limiting, can only properly be read as being constructively preceded by a clause such as "In at least some examples, . . . " For brevity and clarity of presentation, this implied leading clause is not repeated ad nauseum.

Merchants and/or issuers of payment accounts frequently serve a potentially large number of users having multiple different types of payment devices, payment accounts and/or different types of biometric data associated with each user's profile. It is possible for a system to erroneously identify an incorrect payment account based on biometric data provided by a given user when the physical payment device is not physically present. For example, the system may identify more than one user and hence payment account based on a single set of input biometric data. In such cases, a transaction amount could potentially be applied to an incorrect payment account, resulting in a user inadvertently being charged for items which were not purchased and/or a user obtaining items without having the correct amount charged to the appropriate payment account of that user. This results in technologically inefficient and inaccurate authentication of payment transactions.

Aspects of the disclosure provide a more secure way to establish, confirm and verify identity when making a payment transaction at a point of sale, online, with or without a physical payment card. In some examples, secure payment transactions are completed using biometric data along with risk-based authentication (RBA) modeling. In some examples, confidence scores are generated using biometric data and context data associated with a current transaction. In examples in which provided biometric data yields multiple candidate payment accounts, the context data is used with the RBA modeling to generate confidence scores for each of the multiple candidate accounts. The confidence scores are used to select a payment account from the multiple candidate payment accounts. The payment account having the highest confidence score is selected for use in completing the transaction, in some examples. This ensures the payment transaction is performed against the correct payment account.

In some examples, a secure payment system collects or otherwise identifies the context data used. The secure payment system identifies one or more pieces of contextual information, context data, or the like, about the transaction that are used to "score" the transaction for each of the candidate payment accounts, using the RBA modeling or similar scoring techniques that are typically applied in the context of e-commerce transactions. In this case, example context data includes device information, which can include information about the computing device used during the transaction, such as a unique hardware identifier, or an IP address associated with the device. Additionally, or alternatively, context data includes merchant information (e.g., name, location), transaction amount, time of day, transaction type, product or service being purchased, purchase history associated with the candidate payment accounts, etc.

In an example, a transaction processing system (TPS) provides merchants and/or banks an option to perform RBA modeling and/or other decisioning on transactions prior to the completing a transaction. The RBA modeling process is used by the disclosure to identify a primary account number (PAN) out of a set of possible PANs identified by biometric data associated with a client making the transaction. The RBA modeling includes an artificial intelligence model that uses information from the context of the transaction to identify the correct PAN with which to complete the transaction. In one example, a bank can offer or provide this risk-based decisioning process to one or more of their associated merchants, and thus engage the TPS of the payment network to perform this process for those merchant transactions. In other words, the payment network provides this service on behalf of the acquiring banks to the merchants. In another example, merchants directly engage the payment network to perform this process on behalf of the merchant. In yet another example, a third-party processing service performs this process on behalf of the merchant.

Using biometric data enables the system to lower the risk and increase security of a given transaction. The use of RBA based on the biometric data and context data as described herein further enables reduced use of network resources by reducing the number of two-factor challenges being performed and the number of messages transmitted and processed across the network. Instead of requiring an additional challenge or verification on a transaction where the user has only provided biometric data which maps to multiple payment accounts, the present system intelligently determines which payment account is the user's actual account. This reduces the friction to complete the transaction and avoids the burden on the consumer to provide further identification or authentication. (e.g., two-factor authentication is not required to be performed).

In this manner, using RBA modeling with context data to generate confidence scores to identify the appropriate payment account reduces the error rate and improves user efficiency via the user interface by permitting the user to authorize payment transactions using biometric data without additional two-step authentication procedures. This enables a smoother completion of payment transaction with fewer steps for the user to perform. Further, this reduces processor load and increases the speed of processing transactions while improving the accuracy of biometric identification using contextual information based on historic payment data and other context data associated with the transaction and/or prior transactions.

In some examples, the described POS terminal interface device associated with a conventional merchant payment terminal operates in an unconventional manner by automatically determining a confidence score for candidate payment accounts and selecting an account to ensure payment transactions are performed against the correct account. This reduces the dependency of consumers on payment devices, such as cards or mobiles, to pay and enables a more convenient transaction completion, improves user efficiency via the UI interaction, and reduces the number of identification and verifications steps for customers at check-out, thereby improving the functioning of the underlying POS/payment terminal.

FIG. 1 is a block diagram illustrating a system 100 configured to accept biometric data for a secure payment transaction. A user 110 provides biometric information to a biometric device 120, which is communicatively coupled to a point-of-sale terminal. The biometric device 120 can be an optical scanner, a capacitive scanner, thermal line scanner, a biometric authentication device, fingerprint scanner, retinal scanner, imaging device, microphone, a sensor and/or any other device for gathering, generating, or detecting biometric data. The biometric device 120 includes an input 122 that accepts biometric information such as a wave of a hand, a presentation of a face, a presentation of a smile. The input 122 can further include a facial image, an image of a smile, an image of a hand, a retinal scan. In some examples, biometric information includes a fingerprint, thumbprint, palm print, retinal pattern, vein pattern, iris image, or any other biometric data capable of being used to authenticate the consumer. Biometric information in other examples also includes behavioral information associated with the user 110, such as speech pattern, gait, etc.

A processor 124 accepts the biometric information. In some examples, the processor 124 includes any programmable system including a micro-controller, a reduced instruction set circuit (RISC), application specific integrated circuits (ASICs), a system-on-a-chip (SoC), logic circuits and any other circuit or processor capable of executing software or firmware stored in memory 128 to perform functions described herein. The memory 128 optionally includes RAM memory, ROM memory, EPROM memory, EEPROM memory, and non-volatile memory (NVRAM) memory. These memory types are not limiting to the type of memory usable for storage of a computer program.

Biometric device 120 further includes an interface 130 and an output authorization 126. The output authorization 126 can be a message to the user 110 indicating if the sales transactions is approved or the output authorization 126 may request additional information from the user 110.

The confidence score is a score or ranking indicating a level of confidence associated with using a particular payment account to complete a given transaction associated with a user. In some examples, the confidence score associated with a payment account is calculated or otherwise determined using biometric data provided by the user and context data associated with the transaction using RBA modeling in one or more components of the system 100, as described herein. The confidence score is any type of value, such as, but not limited to, a percentage value, a ranking, a number on a scale, a grade, or any other value. For example, a confidence score can be a percentage value, such as, but not limited to, fifty percent, seventy-five percent, etc. A ranking indicates a rank of a given account, such as first, third, fifth or any other type of ranking. A confidence score on a number scale can be value within a range. For example, a confidence score can be a number value on a scale from zero to one-hundred, a scale from zero to one-thousand, or any other number. In still other examples, the confidence score is a color, letter, or other indicator. For example, a confidence score "A" can indicate a high confidence while a confidence of "D" or "F" can indicate a low confidence. A confidence score is calculated for each of the candidate payment accounts associated with input biometric data, as described herein.

A server system 140 includes an interface 142 that is communicatively coupled to biometric device 120 via interface 130. The server system 140 further includes a processor 144, and a memory 146. The server system 140 is communicatively coupled to a database server 150 that stores one or more biometric identifiers (IDs) 154, card ID 152, and context information 156. The server system 140 functions to map biometric data provided by user 110 to biometric ID 154 and card ID 152. The server system 140 is further coupled to an AI model 160. The AI model 160 communicates with the server system 140 to retrieve card ID 152, context information 156 from the database server 150 to determine a confidence score associated with a candidate payment account. For example, the AI model 160 can be implemented using machine learning, neural networks, convolution neural networks, deep learning, and generative adversarial networks.

In the example of FIG. 1, the server system 140 maps the biometric data to biometric ID 154, and also maps the biometric ID 154 to card ID 152. In other examples, the functionality of the server system 140 is split between a biometric service provider that maps the biometric data to the biometric ID 154, and a biometric identity switch that maps the biometric ID 154 to the card ID 152 (and related context data). In such examples, the biometric service provider includes an artificial intelligence system for comparing biometric data against reference data, which is separate from the AI model 160 that takes the card ID 152 and compares current context data against previous transaction data.

The AI model 160 in some examples includes pattern recognition, modeling, or other machine learning algorithms to analyze sensor data and/or database information to generate confidence scores or other rankings for each of the candidate payment accounts.

In some examples, the AI model 160 is an RBA model trained using training data generated based on card-present transactions. The AI model 160 in other examples is retrained or updated using feedback and/or updated training data. The feedback is feedback provided by one or more users. The feedback further refines the model to generate more accurate confidence scores for payment accounts.

Figure 2:
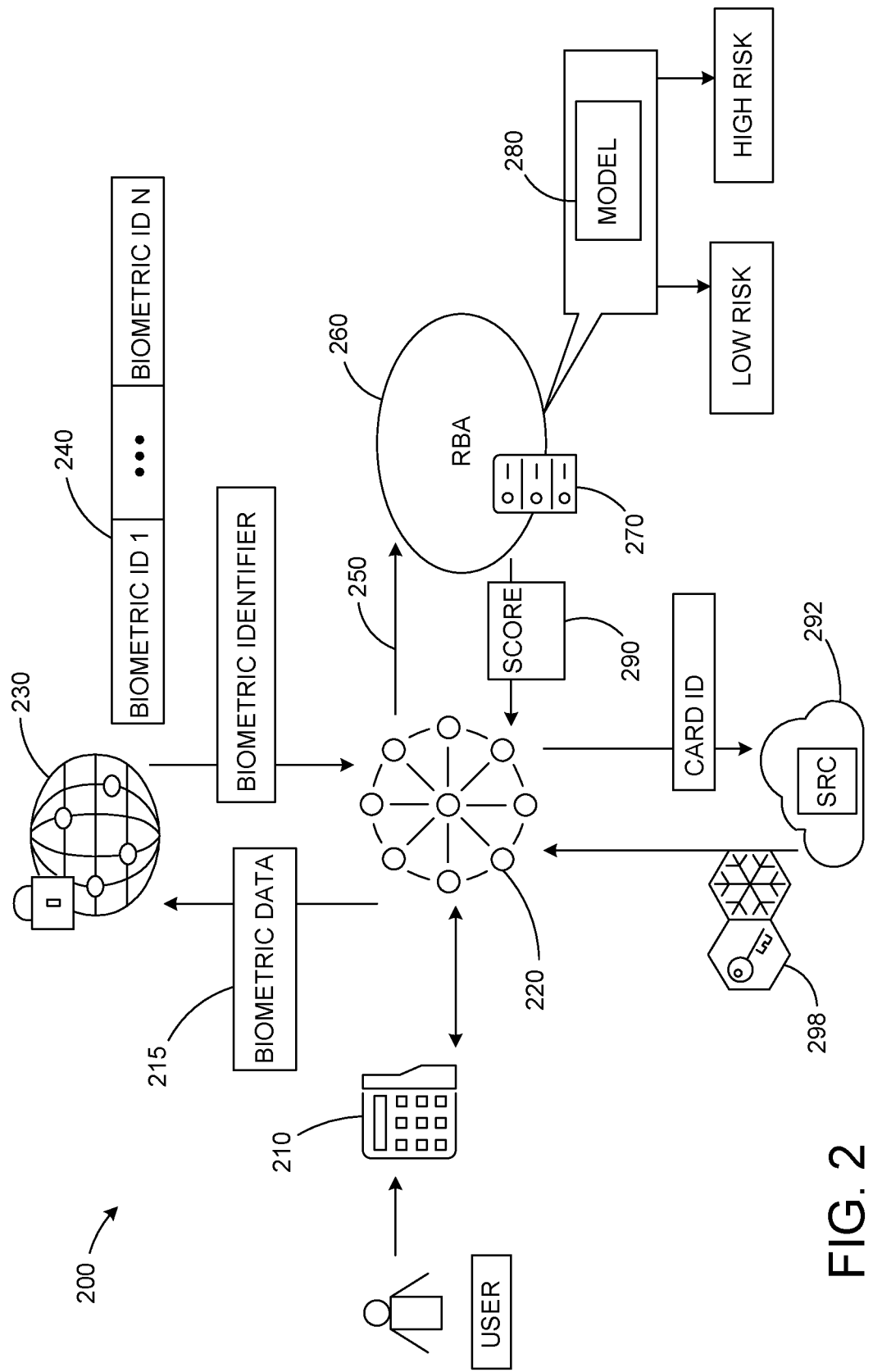
FIG. 2 is a schematic diagram illustrating an example secure payment transaction card system for authorizing payment card transactions and, more specifically for using biometric data for card-not-present (CNP) transactions during user authentication and/or payment authorization of a payment-by-card transaction.

FIG. 2 is a system schematic diagram of an example biometric checkout system 200 using risk-based authentication. In some examples, the system 200 is part of, includes, or is otherwise associated with a system such as system 100 of FIG. 1. During checkout for a purchase of an item(s), a user presents their biometric data 215 to a biometric checkout 210 (shown in FIG. 1 as the biometric device 120). The biometric data 215 is transferred by a biometric identity switch 220 to a biometric service provider 230 (shown in FIG. 1 as a server system 140). The biometric service provider 230 maps the biometric data 215 to determine a plurality of biometric identifiers 240, each associated with a candidate payment account, such as biometric ID 1 through biometric ID N. The biometric identifiers 240 are then transferred to the biometric identity switch 220 that looks up the corresponding payment accounts. The biometric identity switch 220 retrieves current transaction context and transfers 250 this information along with the payment accounts to Risk Based Authentication 260.

The RBA 260 retrieves historical payment card transactions (e.g., face to face transactions) from database 270 (shown in FIG. 1 as the database server 150). A payment card is a payment card associated with a user payment account, such as, but not limited to, a payment card, a debit card, a gift card, a rewards card, a frequent shopper card, a cryptocurrency card, or any other type of account which can be used for full or partial payment of a transaction amount.

The RBA 260 utilizes model 280 to determine a confidence score 290. In some examples, the model 280 is a machine learning model for generating confidence scores, such as, but not limited to, the AI model 160 in FIG. 1. The model 280 determines a confidence score 290 for each of the candidate payment accounts. The confidence scores range from "low risk" to a "high risk" depending on the transaction context input into the model 280. The RBA 260 then transmits the confidence score 290 for each of the candidate payment accounts to the biometric identity switch 220 to identify the payment card ID of the correct payment account. In some examples, the selected payment card ID is the payment card ID with the highest confidence score 290, indicating that it is the payment card ID that is most likely to be correct based on the biometric data and the context data associated with the transaction. The correct payment card ID is transferred to a Secure Remote Commerce (SRC) 292 engine to begin the process of securing payment for the transaction. The SRC 292 generates a token 298 for the selected payment card ID having the highest confidence score 290, and the process provides the token 298 to authorize payment to the merchant.

In some examples, the model 280 is an artificial intelligence-based model that can be implemented using machine learning, neural networks, convolution neural networks, deep learning, and generative adversarial networks, historical payment card transactions. As an increasing number of transactions are performed by the user, the number of historical payment card transactions grows and the model 'learns' about context of these transactions, as described below in FIG. 5. As the model learns, the identification of a genuine PAN increases, resulting in decreasing the risk of incorrect transactions.

Figure 3:
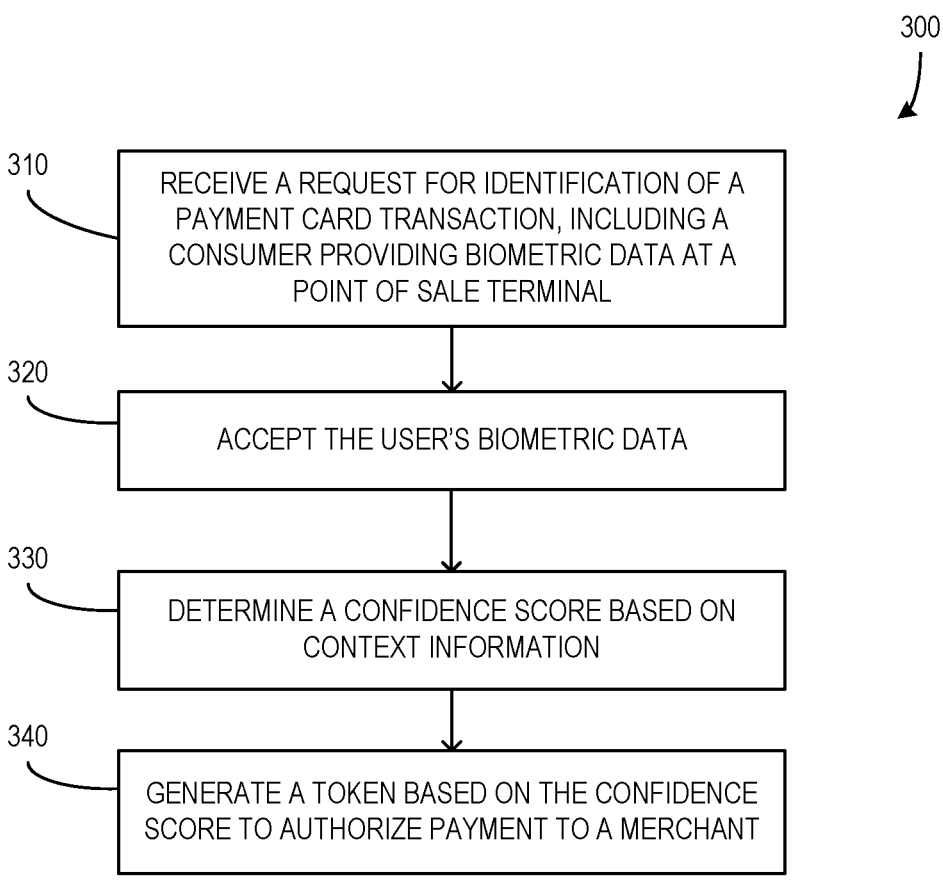
FIG. 3 is a flowchart illustrating operation of a computing device using RBA with biometric data in a secure payment system.

FIG. 3 is a flowchart illustrating a computerized system of processing biometric data in the secure payment system of FIG. 2. At 310, the computerized system receives a request for authentication of a payment card transaction, including a consumer providing biometric data at a point-of-sale terminal at a merchant location. In an example, the payment transaction can be a contactless transaction, the contactless transaction requiring no physical payment card. For example, a biometric input device that is in communication with the point-of-sale terminal is in communication with a server system that is interconnected to the internet through local area network (LAN) or wide area network (WAN), dial-in-connections, cable modems, or any device capable of interconnecting to the internet.

At 320, a biometric input device accepts the user's biometric data. As discussed herein, biometric data can include a facial image, an image of a smile, an image of a hand, a retinal scan, or the like. In the example of FIG. 3, the biometric data is mapped to a plurality of card IDs.

At 330, an authentication server determines a confidence score for each of the card IDs based on context information. Context information may include a transaction amount, a merchant ID, a merchant category code, a user shopping history, a purchase history, a transaction type, a purchase history, a transaction environment, and a merchant risk profile. The authentication server can be risk-based authentication that utilizes a trained artificial intelligence model, discussed in FIG. 5. The AI model provides a confidence score for each of the card IDs (e.g., payment card IDs and/or other payment account identifiers).

At 340, the authentication server generates a token for the card ID with the highest confidence score to authorize payment to a merchant. The token includes tokenized payment data, the tokenized payment data includes the selected card ID (or other payment account identifier), a merchant name, a merchant country code, a merchant category code, a transaction type, currency, a date and time of transaction, a terminal device ID, and a device country code.

FIG. 4 is a flowchart illustrating a computerized method 400 for accepting biometric data during a secure payment transaction, with additional details relative to FIG. 3. In some examples, the method 400 is executed or otherwise performed by a system such as system 100 of FIG. 2 and/or components thereof.

At 410, a transaction processing system (TPS) receives a request for authentication of a transaction, wherein the request includes biometric data associated with the user. The biometric data can include one or more of the following: an image of a fingerprint, a facial image, an image of a smile, an image of a hand, a retinal scan. The biometric data can further include a presentation of a face, a presentation of a smile, and also can include hand gestures such as a wave of the hand or any combination thereof.

At 420, the process identifies a plurality of accounts associated with the biometric data, wherein each payment card account is associated with a different cardholder. For example, this can include mapping, at 430, the biometric data associated with the user to a plurality of biometric identifiers. A biometric identifier is created by the system 100 when the user uploads biometric information when registering their specific payment card. For example, when registering the assigned payment card with its unique payment card number as its identification, the user can upload a retinal scan, an image of a fingerprint, and the like. Thus, the biometric data provided by a payment card holder is associated with a biometric identifier. The biometric identifier is preselected and assigned by a user to the user's account. Therefore, when a user performs a transaction, their particular biometric data is transmitted at the point-of-sale having a biometric checkout to a biometric identity switch. The biometric identity switch transmits the biometric data to a biometric service provider that maps the biometric data provided at the point of sale to the biometric information previously stored in a database when the user registered their issued payment card. In the example of FIG. 4, a mapping of the biometric data to identify a biometric identifier results in identification of multiple biometric identifiers.

In some examples, the biometric service provider further obtains and stores context data associated with a particular user. As part of the authorization process, the biometric data switch retrieves context data from the biometric service provider.

At 440, the process utilizes risk-based-authentication to calculate confidence scores. By utilizing the biometric identifier associated with a particular payment card ID and by including transaction context, the RBA performs a level of risk analysis for that particular payment card ID. Context data can include one or more of the following: a transaction amount, a merchant ID, a merchant category code, a user's shopping history, a user's purchase history, a transaction type, a purchase history, a transaction environment, and a merchant risk profile. The RBA generates a confidence score, which can be anywhere from a high confidence score to a low confidence score. The RBA calculates a confidence score for each of the biometric identifiers identified in operation 430. A high confidence score for a particular biometric identifier indicates that that particular biometric identifier is the correct one for the current transaction.

At 450, the process continues by selecting one of the plurality of accounts based on the determined confidence score (e.g., select the account with the highest score) to process the secure payment transaction. Upon determining the confidence score, the biometric switch is able to identify the correct payment card ID that is transferred to a Secure Remote Commerce (SRC) to begin the process of securing payment for the transaction.

If all the confidence scores are considered low, the system may trigger a prompt requesting the user provide one or more items of additional authorization information (e.g., identification information), such as a PIN, password, social security number, a birthdate, a street address, a driver's license number, a billing address, a home phone number, a work phone number, a shipping address, or a combination thereof.

At 460, the process continues by having the SRC generate a token for the selected account (e.g., having the highest confidence score), and the process provides the token to authorize payment to the merchant against the selected account. The token includes tokenized payment data that includes, for example, account information, a merchant name, a merchant country code, a merchant category code, a transaction type, a currency, a date and time of transaction, a terminal device ID and a device country code. The token is transmitted from the SRC to the payment service provider to complete the transaction.

FIG. 5 is a flowchart illustrating a computerized method 500 for training an artificial intelligence model for determining a confidence score upon accepting biometric data during a secure payment transaction. At 510, a user provides biometric data to a biometric device, such as at a point-of-sale terminal that is connected to a payment network.

At 520, the payment network acquires a user personal account number (e.g., a cardholder account number), and transaction context. Transaction context includes a transaction amount, a merchant ID, a merchant category code, a user shopping history, a purchase history, a transaction type, a transaction environment, and/or a merchant risk profile.

At 530, a secure remote commerce stores face-to-face transaction data, including the transaction context from operation 520, in a database.

At 540, a risk-based authentication system retrieves low-risk transaction data and high-risk transaction data. The low-risk transaction data includes genuine combinations of card IDs and transaction contexts, such as stored in the database in operation 530. The high-risk transaction data includes false combinations of card IDs and transaction contexts. These false combinations are generated by the system to train the AI model.

At 550, the AI model is trained on the low-risk and high-risk transactions from operation 540.

In some examples, to train the AI model to distinguish between low risk and high risk transactions, four types of data are input into the model: Bank for International Settlement (BIS) knowledge, transaction data, issuer data and payment data. BIS knowledge includes, for example, a cardholder email address, a mobile phone number, cardholder delivery address, preferred merchants, a number of transactions per day/week, month or year, a daily profile, as well as suspicious activity. Transaction data includes a merchant name and ID, an acquirer ID, a merchant country code, a merchant category code, a transaction type, a currency, a data and time, a device ID, a device country code. Issuer data includes cardholder account information and a merchant risk indicator. Payment data includes cardholder account number, e.g., PAN.

Operational data is further used to train the model based on a particular user profile, such as, initial enrollment data, age of the user, various modalities for transactions, recent scores, and a risk profile. In addition, biometric data for a particular user includes, for example, biometric ID, a current score, liveness indication, modalities for transactions, device information (e.g., including software version, location, and device capabilities). This additional operational data is utilized to strengthen the model over time as the number of transactions increases.

Associated with the RBA, the AI model provides a confidence score indicating low risk or high risk, in some examples. A low risk transaction corresponds to a high confidence score. A high risk transaction corresponds to a low confidence score.

ADDITIONAL EXAMPLES

In some examples, when a list of candidate payment accounts holds multiple entries, contextual information can be used by an AI model to reduce the number of candidates to one with high confidence. Contextual information can also be used to increase (or decrease) the confidence around a single entry in the candidate list. Risk-based authentication tools are used to generate the confidence scores and identify the lowest-risk candidate having the highest confidence score. The AI model is trained, in part, using card-based payment transactions in which the physical payment card or other payment device is present during completion of the payment transaction process.

The RBA modeling is used in some examples to identify a correct payment account from a plurality of payment accounts associated with multiple different users associated with a single biometric input (e.g., fingerprint of a cardholder). The system generates the confidence scores using the RBA modeling to identify a correct payment account from a plurality of payment accounts associated with a single user. In these examples, the system compares confidence scores to identify a highest confidence score. However, the system is not limited to using the highest confidence score. In other examples, a threshold is applied to the confidence score to determine whether a score for a particular account is sufficiently high to authorize the transaction. If the confidence score exceeds a minimum threshold value, the transaction is authorized.

In an example scenario, a consumer presents their biometric data at a POS device. The biometric data is exchanged for one or more biometric identifiers. The biometric identifier(s) are mapped against payment accounts, such as payment card IDs. In combination with transaction context, the biometric identifiers are used to obtain confidence score(s) from the RBA platform. Tokenized payment data is generated for the payment account with the highest confidence score. The merchant receives the tokenized payment data to complete the transaction.

Exemplary Operating Environment

Figure 6:
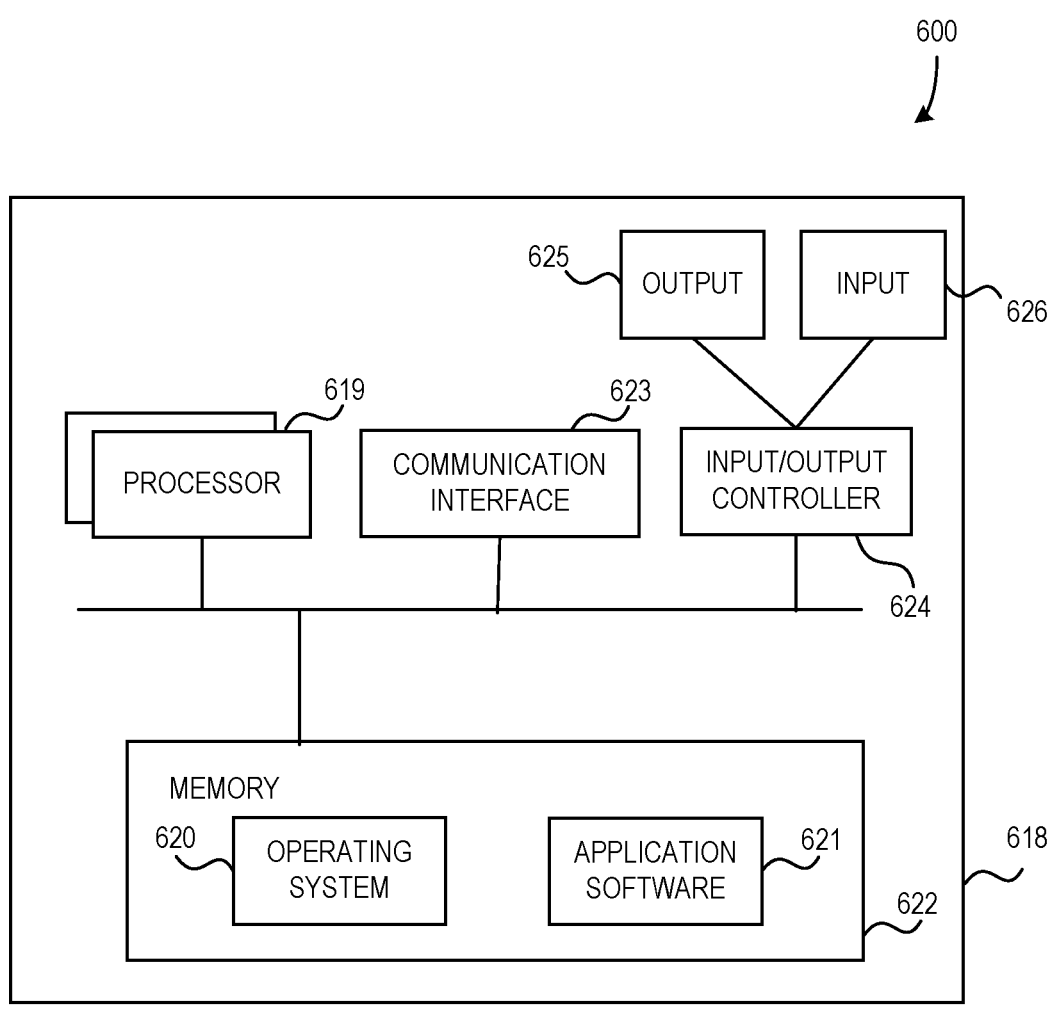
FIG. 6 illustrates an example computing apparatus as a functional block diagram.

The present disclosure is operable with a computing apparatus according to an embodiment as a functional block diagram 600 in FIG. 6. In an example, components of a computing apparatus 618 are implemented as a part of an electronic device according to one or more embodiments described in this specification. The computing apparatus 618 comprises one or more processors 619 which can be microprocessors, controllers, or any other suitable type of processors for processing computer executable instructions to control the operation of the electronic device. Alternatively, or in addition, the processor 619 is any technology capable of executing logic or instructions, such as a hardcoded machine. In some examples, platform software comprising an operating system 620 or any other suitable platform software is provided on the apparatus 618 to enable application software 621 to be executed on the device. In some examples, selecting a payment account for a transaction using transaction context data and RBA modeling as described herein is accomplished by software, hardware, and/or firmware.

In some examples, computer executable instructions are provided using any computer-readable media that are accessible by the computing apparatus 618. Computer-readable media include, for example, computer storage media such as a memory 622 and communications media. Computer storage media, such as a memory 622, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 622) is shown within the computing apparatus 618, it will be appreciated by a person skilled in the art, that, in some examples, the storage is distributed or located remotely and accessed via a network or other communication link (e.g., using a communication interface 623).

Further, in some examples, the computing apparatus 618 comprises an input/output controller 624 configured to output information to one or more output devices 625, for example a display or a speaker, which are separate from or integral to the electronic device. Additionally, or alternatively, the input/output controller 624 is configured to receive and process an input from one or more input devices 626, for example, a keyboard, a microphone, or a touchpad. In one example, the output device 625 also acts as the input device. An example of such a device is a touch sensitive display. The input/output controller 624 in other examples outputs data to devices other than the output device, e.g., a locally connected printing device. In some examples, a user provides input to the input device(s) 626 and/or receive output from the output device(s) 625.

The functionality described herein can be performed, at least in part, by one or more hardware logic components. The computing apparatus 618 is configured by the program code when executed by the processor 619 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a- chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

An exemplary system comprises at least one processor and at least one computer readable medium storing computer-executable instructions, which, when executed by the at least one processor, cause the at least one processor to: identify a plurality of payment accounts corresponding to biometric data associated with a user in response to a request for authentication of the user associated with completion of a payment transaction; calculate a plurality of confidence scores using the biometric data and context data associated with the request for authentication, the plurality of confidence scores comprising a confidence score for each account in the plurality of payment accounts; select an account from the plurality of payment accounts associated with a highest confidence score; and generate a token based on the highest confidence score to authorize payment using the selected account from the plurality of payment accounts for completion of the payment transaction.

An exemplary computerized method comprises identifying a plurality of payment accounts corresponding to biometric data associated with a user in response to an authentication request; calculating a plurality of confidence scores using the biometric data and context data associated with a request for authentication of the user associated with completion of a payment transaction, the plurality of confidence scores comprising a confidence score for each account in the plurality of payment accounts; selecting an account from the plurality of payment accounts having a highest confidence score; and triggering completion of the payment transaction using the selected account from the plurality of payment account.

One or more computer storage media have computer-executable instructions that, upon execution by a processor, cause the processor to at least: identify a plurality of payment accounts corresponding to biometric data associated with a user in response to an authentication request; calculate a plurality of confidence scores using the biometric data and context data associated with a request for authentication of the user associated with completion of a payment transaction, the plurality of confidence scores comprising a confidence score for each account in the plurality of payment accounts; select an account from the plurality of payment accounts having a highest confidence score; and authenticate the selected account from the plurality of payment accounts for completion of the payment transaction.

Alternatively, or in addition to the other examples described herein, examples include any combination of the following:

a biometric input device in communication with the terminal for detecting and verifying a predetermined biometric input to establish the presence of the account holder, wherein the biometric input device comprises at least one of a fingerprint scanner, a finger vein detector, a camera, and a facial detection device, a biometric input device generating the biometric data, wherein the biometric data comprises at least one of a facial image, an image of a smile, an image of a hand, or a retinal scan;

a point-of-sale terminal for processing a transaction;

an identification server programmed to accept the biometric data, and wherein the confidence score is associated with one or more multiple biometric identifiers based on biometric data;

a server that maps biometrics identifiers to payment accounts, stores transaction context for each of these payment accounts and generates generates confidence scores for one or more payment accounts based on a plurality of context information, wherein the server generates the token based on the highest confidence score to authorize payment to a merchant, and wherein the context information includes a transaction amount, a merchant ID, a merchant category code, a user shopping history, a purchase history, a transaction type, a purchase history, a transaction environment, and a merchant risk profile;

wherein the token includes tokenized payment data, the tokenized payment data includes a merchant name, the selected account, a merchant country code, a merchant category code, a transaction type, currency, a date and time of transaction, a terminal device ID, and a device country code;

wherein the payment transaction can be a deviceless transaction, enabling completion of the payment transaction in an absence of a physical payment card;

identifying a plurality of payment accounts corresponding to biometric data associated with a user in response to an authentication request;

calculating a plurality of confidence scores using the biometric data and context data associated with a request for authentication of the user associated with completion of a secure payment transaction, the plurality of confidence scores comprising a confidence score for each account of a plurality of candidate payment accounts;

selecting an account from the plurality of payment accounts having a highest confidence score;

triggering completion of the secure payment transaction using the selected account from the plurality of payment account;

detecting a gesture comprising at least one of a wave of a hand, a presentation of a face, or a presentation of a smile;

receiving the biometric data from a biometric input device, wherein the biometric data comprises at least one of a facial image, an image of a smile, an image of a hand, a retinal scan;

comparing a confidence score of a given user account with a threshold value, wherein a confidence score exceeding the threshold value indicates the confidence score is a high confidence score corresponding to a low-risk transaction, the high confidence score is associated with a specific user account having a particular biometric identifier based on the biometric data;

identifying a payment account associated with a low confidence score indicating a high-risk transaction, wherein the low confidence score indicates that the input biometric data could be associated with a plurality of user accounts (or a plurality of biometric identifiers);

prompting a user to provide additional authorization information in response to determining the highest confidence score of the selected account is below a minimum threshold value;

wherein the context data comprises at least one of a transaction amount, a merchant ID, a merchant category code, a user shopping history, a purchase history, a transaction type, a purchase history, a transaction environment, or a merchant risk profile;

mapping the biometric data associated with a user to a biometric identifier, the biometric identifier being pre-selected and assigned by a user to the user's account;

calculate a plurality of confidence scores using the biometric data and context data associated with a request for authentication of the user associated with completion of a payment transaction;

obtaining the context data from a biometric identity switch;

generating a token for the selected payment account and providing the token to authorize payment to a merchant; and wherein the token comprises tokenized payment data, the tokenized payment data includes the selected account identifier, a merchant name, a merchant country code, a merchant category code, a transaction type, currency, a date and time of transaction, a terminal device ID, and a device country code.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent can take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for receiving a request for authentication of the user as part of the secure payment transaction, the request including biometric data associated with the user; exemplary means for identifying a plurality of accounts associated with the biometric data, wherein each of the plurality of accounts is associated with a different user; exemplary means for determining a confidence score for each of the plurality of accounts based on context data associated with the secure payment transaction; and exemplary means for selecting one of the plurality of accounts based on the determined confidence scores to process the secure payment transaction.

The term "comprising" is used in this specification to mean including the feature(s) or act(s) followed thereafter, without excluding the presence of one or more additional features or acts.

In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Within the scope of this application, it is expressly intended that the various aspects, embodiments, examples, and alternatives set out in the preceding paragraphs, in the claims and/or in the description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim, accordingly, including the right to amend any originally filed claim to depend from and/or incorporate any feature of any other claim although not originally claimed in that manner.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A secure payment transaction system, the system comprising:

at least one processor; and at least one computer readable medium storing computer-executable instructions, which, when executed by the at least one processor, cause the at least one processor to:

obtain low-risk transaction data and high-risk transaction data associated with historical transactions, the low-risk transaction data including genuine combinations of payment card identification (ID) data and context data associated with the historical transactions, the high-risk transaction data being generated by the payment transaction system and including a false combination of payment card ID data and associated context data;

train an artificial intelligence (AI) model, using the genuine combination and the false combination to distinguish between low-risk transactions and high-risk transactions;

receive a request for identification of a user associated with a payment transaction, the request providing biometric data of the user;

in response to the received request, identify a plurality of candidate payment accounts corresponding to the provided biometric data;

using the trained AI model, calculate a plurality of confidence scores associated with each of the plurality of candidate payment accounts, the trained AI model using a combination of the biometric data and context data associated with the request for the identification, the context data including merchant data, a transaction amount, and a product or service identifier;

select an account from the plurality of candidate payment accounts having a highest confidence score;

generate a token for the selected account based on the highest confidence score; and authorize payment for the payment transaction using the generated token for the selected account.

2. The system of claim 1, wherein the AI model uses additional context data comprising one or more of the following: a time of day, a transaction type, or a purchase history associated with the payment accounts, to calculate the plurality of confidence scores.

3. The system of claim 1, further comprising:

a point-of-sale terminal configured to process a transaction; and a biometric input device in communication with the terminal configured to detect and verify a predetermined biometric input, that includes a liveness detection, to identify an account holder, wherein the biometric input device comprises one or more of the following: a fingerprint scanner, a finger vein detector, a camera, a facial detection device, and wherein the confidence scores are associated with one or more user accounts and one or more multiple biometric identifiers based on biometric data.

4. The system of claim 1, further comprising:

an identification server programmed to accept the biometric data, the confidence score, and a plurality of context information, wherein the server generates the token based on the highest confidence score to authorize payment to a merchant, and wherein the context information includes one or more of the following: a merchant ID, a merchant category code, a user shopping history, a purchase history, a transaction type, a transaction environment, and a merchant risk profile.

5. The system of claim 1, wherein the AI model is associated with risk-based authentication modeling to identify a correct payment account from the plurality of candidate payment accounts associated with multiple different users associated with the same biometric data, by generating confidence scores associated with the plurality of candidate payment accounts and comparing the confidence scores to select a payment account associated with the highest confidence score.

6. The system of claim 2, wherein the artificial intelligence model is refined using feedback from the user to generate accurate confidence scores for payment accounts.

7. A method for identifying a user for a secure payment transaction, the method comprising:

identifying a plurality of payment accounts corresponding to biometric data associated with a user in response to an identification request;

obtaining low-risk transaction data and high-risk transaction data associated with historical transactions, the low-risk transaction data including a genuine combination of a payment card identification (ID) data and context data associated with the historical transactions, the high-risk transaction data being generated by a payment transaction system and including a false combination of payment card ID data and associated context data;

training an artificial intelligence (AI) model using the genuine combination and the false combination, to distinguish between low-risk transactions and high-risk transactions;

receiving a request for identification of a user associated with a payment transaction, the request providing biometric data of the user;

in response to the received request, identifying a plurality of candidate payment accounts corresponding to the provided biometric data;

using the trained AI model, calculating a plurality of confidence scores associated with each of the plurality of candidate payment accounts, the trained AI model using a combination of the biometric data and context data associated with a request for the identification, the context data including merchant data, a transaction amount, and a product or service identifier;

selecting an account from the plurality of candidate payment accounts having a highest confidence score;

generating a token for the selected account based on the highest confidence score; and authorizing payment for the payment transaction using the generated token for the selected account.

8. The method of claim 7, wherein the AI model uses additional context data comprising one or more of the following: time of day, transaction type, or purchase history associated with the payment accounts, to calculate the plurality of confidence scores.

9. The method of claim 7, wherein the context data comprises one or more of the following: a merchant ID, a merchant category code, a user shopping history, a purchase history, a transaction type, a transaction environment, and a merchant risk profile.

10. The method of claim 7, further comprising:

comparing a confidence score of a given payment account with a threshold value, wherein a confidence score exceeding the threshold value indicates the confidence score is a high confidence score corresponding to a low-risk transaction.

11. The method of claim 7, further comprising:

identifying a payment account associated with a low confidence score indicating a high-risk transaction.

12. The method of claim 7, wherein the AI model is refined using feedback from the user to generate accurate confidence scores for payment accounts.

13. The method of claim 11, further comprising:

prompting the user to provide identification information in response to determining that the low confidence score is below a minimum threshold value.

14. The method of claim 7, further comprising:

mapping the biometric data associated with the user to a biometric identifier, the biometric identifier being assigned to an account of the user.

15. The method of claim 7, wherein the plurality of confidence scores is calculated by the artificial intelligence model trained with training data generated from card-present transactions.

16. A computer storage medium having computer-executable instructions that, upon execution by a processor of a computer, cause the processor to at least:

obtain low-risk transaction data and high-risk transaction data associated with historical transactions, the low-risk transaction data including genuine combinations of payment card identification (ID) data and context data associated with the historical transactions, the high-risk transaction data being generated by a payment transaction system and including a false combination of payment card ID data and associated context data;

train an artificial intelligence (AI) model, using the genuine combination and the false combination to distinguish between low-risk transactions and high-risk transactions;

receive a request for identification of a user associated with a payment transaction, the request providing biometric data of the user;

in response to the received request, identify a plurality of candidate payment accounts corresponding to the provided biometric data;

using the trained AI model, calculate a plurality of confidence scores associated with each of the plurality of candidate payment accounts, the trained AI model using a combination of the biometric data and context data associated with the request for the identification, the context data including merchant data, a transaction amount, and a product or service identifier;

select an account from the plurality of candidate payment accounts having a highest confidence score;

generate a token for the selected account based on the highest confidence score; and authorize payment for the payment transaction using the generated token for the selected account.

17. The computer storage medium of claim 16, wherein the AI model uses additional context data comprising one or more of the following: time of day, transaction type, or purchase history associated with the payment accounts, to calculate the plurality of confidence scores.

18. The computer storage medium of claim 16, wherein the instructions, when executed by a processor of the computer, cause the computer to further perform:

map the biometric data associated with a user to a biometric identifier.

19. The computer storage medium of claim 16, wherein the artificial intelligence model is refined using feedback from the user to generate accurate confidence scores.

20. The computer storage medium of claim 16, wherein the AI model is associated with risk-based authentication modeling to identify a correct payment account from the plurality of candidate payment accounts associated with multiple different users associated with the same biometric data, by generating confidence scores associated with the plurality of candidate payment accounts and comparing the confidence scores to select a payment account associated with the highest confidence score.

\* \* \* \* \*